United States Patent Office 3,423,387
Patented Jan. 21, 1969

3,423,387
PROCESS FOR THE POLYMERIZATION OF CONJUGATED DIENES
Shotaro Sugiura, Haruo Ueno, Shunsuke Nakatomi, Hideo Ishikawa, and Tosihiro Inoue, Yamaguchi-ken, Japan, assignors to Ube Industries, Ltd., Yamaguchi-ken, Japan
No Drawing. Filed Dec. 22, 1966, Ser. No. 603,775
U.S. Cl. 260—94.3                    7 Claims
Int. Cl. C08d 1/16; C08f 1/28, 1/56

This invention relates to a process for the polymerization of conjugated dienes. More particularly, the present invention relates to a process of polymerizing conjugated dienes to form conjugated diene polymers having high molecular weights and high cis-1,4-addition contents, by contacting a conjugated diene under polymerization conditions with a catalyst prepared from an organic aluminum compound and a material formed by electrochemically depositing metallic cobalt, metallic nickel or their mixture on the powder of metallic zinc and/or metallic cadmium.

It is known that catalysts prepared by combination of inorganic or organic compounds of cobalt or nickel and organic aluminum compounds generally prove active in the polymerization of conjugated dienes. Catalysts composed of metallic cobalt or metallic nickel and halogen-containing organic aluminum compounds are also reported to exhibit activity in the polymerization of conjugated dienes. According to experiments conducted by the present inventors, however, those catalysts have so extremely low polymerization activity that they are practically useless as catalysts for commercial production of cis-1,4 conjugated diene polymers.

It has been found that the catalysts prepared in accordance with the present invention from a material formed by electrochemically depositing metallic cobalt, metallic nickel or their mixture on the powder of metallic zinc and/or metallic cadmium (the material being also referred to as the component (A) hereinafter) and an organic aluminum compound (also referred to as the component (B) hereinafter) have extremely high activity in the polymerization of conjugated dienes. When a catalyst according to the invention is used in the polymerization of a conjugated diene, the polymerization reaction can be effected at a very high rate even with a small amount of the catalyst and at a relatively low pressure, particularly at the atmospheric pressure and at or below a room temperature. Furthermore, the conjugated diene polymer thus obtained has a very high cis-1,4-addition content (over 97%) and a high polymerization degree $$([\eta]_{toluene}^{26°C.} = \text{over } 2.0)$$

By contrast, it has been confirmed by the present inventors that catalysts formed by combination of a mere mechanical mixture or alloy of metallic zinc or metallic cadmium and metallic cobalt and/or metallic nickel and an organic aluminum compound have substantially no activity in the polymerization of conjugated dienes.

The component (A) of a catalyst according to the invention is prepared by putting powder of metallic zinc and/or metallic cadmium into an aqueous solution of a water-soluble salt of cobalt and/or metallic nickel (e.g. chloride, bromide, nitrate, sulfate, acetate and the like of cobalt or nickel), continuing agitation of the mixture until the metallic cobalt and/or metallic nickel is electrochemically deposited on the powder of metallic zinc and/or metallic cadmium due to the difference of normal electrode potential between zinc or cadmium and cobalt or nickel, separating the precipitate by filtration, washing the filter cake with water and then drying.

In the preparation of the component (A), a suitable value can be chosen for the concentration of the aqueous solution of salt of cobalt and/or nickel. General convenience is a concentration of 0.1 to 10% by weight in terms of cobalt and/or nickel ions.

The content of cobalt and/or nickel in the component (A) can be varied with the mixing ratio of metallic zinc or metallic cadmium and salt of cobalt and/or nickel, temperature, deposition time and other conditions employed in the preparation of the component (A). From the standpoints of technical simplicity and economy, it is preferable to adjust the content of cobalt and/or nickel in the component (A) by modifying the mixing ratio of the salt of cobalt and/or nickel against the amount of metallic zinc or metallic cadmium.

The component (A) thus prepared, when exposed to the air for long, will have no adverse effect of any kind upon the polymerization activity of the catalyst which is thereby constituted in accordance with the invention.

The component (A) is a magnetic material itself and X-ray diffraction has revealed that the cobalt or nickel in the component (A) has a non-crystalline structure.

When a conjugated diene is polymerized by the use of a catalyst in which the component (A) is combined with an organic aluminum compound which is the component (B), the polymerization activity of the catalyst depends on the conditions adopted for the preparation of the component (A).

A catalyst using a component (A) which is prepared by deposition procedure whereby metallic cobalt and/or metallic nickel is electrochemically deposited on metallic zinc or metallic cadmium at a temperature of 0–50° C., particularly of 5–30° C. and at the lowest possible deposition speed (over a deposition period of more than about two hours) exhibits a most satisfactory polymerization activity for conjugated dienes, whereas a catalyst containing a component (A) prepared at a high deposition temperature above 50° C. and over a relatively short deposition period has a low polymerization activity.

The content of metallic cobalt and/or metallic nickel contained in the component (A) also considerably influences the polymerization activity of the catalyst according to the invention. A catalyst of the invention which is prepared by using a component (A) containing metallic cobalt and/or metallic nickel in the range of 3–50 wt. percent, particularly of 6–30 wt. percent proves very active in the polymerization of conjugated dienes, but a catalyst which is prepared by using a component (A) having a metallic cobalt and/or metallic nickel content above or below the range above specified shows less polymerization activity. In an extreme case, catalysts prepared from metallic zinc, metallic cadmium, metallic cobalt or metallic nickel singly combined with the component (B) exhibit little activity in the polymerization of conjugated dienes.

Also, catalysts obtained by combining the component (B) with the component (A) prepared as described above but subsequently treated with an aqueous solution of alkali hydroxide while being kept within a temperature range suitable for the preparation of the component (A) whereby metallic zinc or metallic cadmium has been dissolved away and only metallic cobalt and/or metallic nickel has been left, or with the component (A) wherein the content of metallic cobalt and/or metallic nickel is increased, fail to show any appreciable activity in the polymerization of conjugated dienes.

It is manifest from the foregoing that the increased polymerization activity of the catalyst according to the invention which uses the component (A) is not attributed to the fact that the specific surface area, and hence the active point, of metallic cobalt or metallic nickel is simply increased by the preparation of the component (A) (on the assumption that the specific surface area of metallic cobalt or metallic nickel in the component (A) is increased over the specific surface area of the powder of metallic cobalt or metallic nickel).

Just as important is the influence which the size of metallic zinc or metallic cadmium for use in the preparation of the component (A) has on the polymerization activity of a catalyst according to the invention. In general a catalyst of the invention which contains the component (A) formed of the powder of metallic zinc or metallic cadmium of a particle size less than that passable through a 48-mesh Tyler's standard sieve has an excellent polymerization activity, while a catalyst also prepared in accordance with the invention using a component, (A) formed of powder or particles of metallic zinc or metallic cadmium having such size which is not passable through the above sieve shows only a limited polymerization activity.

It has also been found that impurities in the component (A) (e.g. salt of metal which constitutes the components (A) and other foreign matter), the presence of which is confined by X-ray diffraction and chemical analysis, are not contributory in any way to the polymerization activity of the catalyst according to the invention.

It has further been found that the polymerization activity of a catalyst wherein component (A) ground, for example, by ball milling is combined with an organic aluminum compound is decreased with an increase in the grinding time.

From the foregoing facts it is apparent that some interaction between the metallic zinc or metallic cadmium and metallic cobalt and/or metallic nickel in the component (A) prepared as above plays an important role in the activity of the catalysts of the invention in the polymerization of conjugated dienes.

Suitable organic aluminum compounds for the component (B) of the catalyst according to the invention are compounds of the general formula $AlR_nX_{3-n}$ (wherein R is alkyl, cycloalkyl, or phenyl radical, X is a halogen atom, and $n$ is a number between 1 and 3 with or without decimals) used either singly or in mixture.

Particularly desirable organic aluminum compounds include monoethyl aluminum dichloride, diethyl aluminum monochloride, triethyl aluminum, diisobutyl aluminum monochloride, diphenyl aluminum monochloride, and dicyclohexyl aluminum monochloride.

The ratio of the components (B) to the component (A) in the catalysts according to the invention which have excellent polymerization activity is more than 0.1 part by weight, and preferably more than 0.3 part by weight, of the component (B) to each part by weight of the component (A). Although there is no special reason from the viewpoint of polymerization activity of the catalyst to define the upper limit of the ratio of the component (B) to the component (A), it is desirable to use the component (B) in an amount not more than about five times by weight the amount of the component (A) for purposes of decreasing the amount of residual catalyst in the polymer and for economic considerations.

Since the catalysts according to the present invention are extremely high in polymerization activity, use of an excessive amount of catalyst for a particular conjugated diene to be polymerized may result in gelation in the course of the polymerization. While the amount of catalyst suitable for the conjugated diene monomer to be used depends on the amount of the latter in the polymerization system, a usually appropriate catalyst amount is such that the amount of the component (A) is 0.05 to 10 g. per 100 g. of the conjugated diene.

Although the catalysts of the invention may be used in the polymerization of a conjugated diene in an inert solvent immediately after the compounding of the two components (A) and (B), the polymerization activity of the catalysts can be remarkably enhanced by aging the catalysts under suitable conditions before they are brought into contact with the conjugated dienes. Suitable aging procedure is to place both of the catalyst components into an inert solvent and to keep them together at a temperature within the range of 10 to 100° C., or slightly above the polymerization temperature, for 30 to 120 minutes. The catalysts thus aged have polymerization activity of five to seven times greater than the values of those not aged.

Conjugated dienes useful in the invention include 1,3-butadiene, isoprene, and 2-methyl-1,3-pentadiene. These conjugated dienes may be either polymerized singly or copolymerized in mixture. Further, the conjugated dienes may be copolymerized with other unsaturated hydrocarbons.

The inert solvent for use in the polymerization of conjugated dienes and the inert solvent for aging of catalysts may be dissimilar, but are preferably the same for convenience. Suitable inert solvents for such purposes are aromatic, saturated aliphatic, and alicyclic hydrocarbons and derivatives thereof (particularly halogen substitution products). Preferably inert solvents for practical use are, for example, benzene, toluene, and monochlorobenzene.

Suitable concentration of conjugated diene monomer in an inert solvent prior to the polymerization is in the range of 5 to 30 wt. percent.

The suitable polymerization temperature is between −20° and +80° C., more preferably between +5° and +50° C. The polymerization may be effected at or above the atmospheric pressure.

In order to terminate the polymerization reaction of the invention, it is only necessary to add to the polymerization system a small amount of substance which inactivates the catalyst, e.g., water, alcohol, acetone, acetic acid, or ether. At that time, addition of an antioxidant of any known type to the conjugated diene polymer is recommended. When the product solution in which the polymerization of conjugated diene has been terminated by the addition of a small amount of the substance which inactivates the catalyst is poured into a large amount of alcohol, e.g., methanol, the polymer of conjugated diene coagulates. The separation and vacuum drying of the resulting solid matter will form a rubber-like conjugated diene polymer.

In the examples of the present invention illustrated hereunder, the microstructures of conjugated diene polymers were determined by the method of R. R. Hampton from the infrared absorption spectra (Analytical Chemistry, 21, 923(1949). The intrinsic viscosity ($\eta$) values of the conjugated diene polymers were calculated on the basis of viscosity in toluene at 26° C. as determined with Ostwald viscometer.

Example 1

Into 12.5 cc. of a solution of one gram of cobaltous chloride ($CoCl_2 \cdot 6H_2O$) in water was placed 3 g. commercially available metallic zinc powder (passable through a 200-mesh Tyler's standard sieve), and the mixture was agitated with a magnetic stirrer at about 25° C. for 2 hours. The precipitate was separated by filtration, thoroughly washed in water, and dried at about 105° C. The resulting powder (i.e. the component (A) of a catalyst according to the invention) upon chemical analysis showed a cobalt content of 10.3 wt. percent.

The addition to 0.7 g. of the powder thus obtained 160 cc. of dry benzene was introduced into a 500 cc. flask (in which the air was replaced by nitrogen gas) kept in a thermostat. With thorough stirring, the mixture was further added dropwise with 6 cc. of a benzene solution containing 1.2 g. (10 mmoles) of diethyl aluminum monochloride, and then aged at 40° C. for one hour. After cooling to 20° C., a solution of 25.0 g. of refined 1,3-butadiene in 170 cc. of dry benzene was added. In about 10 minutes, the mixed solution became viscous and indicated the initiation of polymerization. Thirty minutes after the addition of the 1,3-butadiene solution, the polymerization was terminated by adding small amounts of methanol and phenyl-$\beta$-naphthylamine (anti-oxidant). The charge in the flask was poured into 500 cc. of methanol, then coagulation took place. The solidified matter was washed with methanol, and dried in vacuum at room temperature for 12 hours, thus gave 19.2 g. (yield 76.8%) of a polybutadiene having rubber-like elasticity. The polybutadiene was completely soluble in benzene and no gel was formed. The product was dissolved in carbon disulfide and the residual catalyst was centrifugally eliminated and the resultant solution was determined for the microstructure and intrinsic viscosity. As a result, the polybutadiene was found to consist of 97.8% of cis-1,4-structure, 0.8% of trans-1,4 structure, and 1.4% of 1,2 structure and have an intrinsic viscosity of $$[\eta]^{26°C.}_{toluene} = 3.32$$

Example 2

A powdery material was prepared by electrochemically depositing nickel metal on zinc metal in the same manner as described in Example 1 except that $NiCl_2 \cdot 6H_2O$ was used instead of $CoCl_2 \cdot 6H_2O$. The nickel content of the powdery material was 10.3 wt. percent.

1,3-butadiene was polymerized by the same procedure as in Example 1 except that 0.7 g. of the powder was used in lieu of the component (A) of zinc and cobalt in Example 1 and that the polymerization time was extended to 4 hours.

The polymerization gave 16.5 g. of polybutadiene having a microstructure consisting of 97.4% of cis-1,4 structure, 1.4% of trans-1,4 structure, and 1.2% of 1,2 structure and an intrinsic viscosity of $$[\eta]^{26°C.}_{toluene} = 1.2$$

Examples 3 to 8

The procedure of Example 1 was repeated in the polymerization of 1,3-butadiene under the same conditions as in the Example 1 with the component (A) having the same cobalt content but prepared at different temperatures for different periods of time. The results are shown in Table 1. Gelation was not observed in any of the cases.

TABLE 1

| Ex. | Conditions for preparing Component (A) | | Polymer | | | | |
|---|---|---|---|---|---|---|---|
| | Temp. (°C.) | Time (hr.) | Yield (percent) | $[\eta]$ 26° C. toluene | Microstructure (percent) | | |
| | | | | | Cis-1,4 | Trans-1,4 | 1,2 |
| 3 | 10 | 2.5 | 80.6 | 3.50 | 97.6 | 1.2 | 1.2 |
| 4 | 30 | 2 | 73.2 | 3.30 | 97.8 | 1.4 | 0.8 |
| 5 | 40 | 2 | 35.6 | 3.12 | 98.3 | 0.9 | 0.8 |
| 6 | 50 | 0.5 | 6.5 | 3.28 | 97.8 | 1.1 | 1.1 |
| 7 | 60 | 0.5 | 4.0 | ---- | 97.6 | 1.5 | 0.9 |
| 8 | 90 | 0.1 | 2.0 | ---- | 97.8 | 1.4 | 0.8 |

Examples 9–13

Components (A) of different cobalt contents were prepared under the same conditions as in Example 1 except that the used amount of $CoCl_2 \cdot 6H_2O$ was varied. In the same manner as in Example 1 excepting the use of the components (A) prepared as above, 1,3-butadiene was polymerized. The results are given in Table 2. In none of the cases gelation took place.

In Table 2 there are also given the results with reference examples, i.e. Reference Example 1 wherein the component (A) was replaced by metallic zinc powder alone, Reference Example 2 wherein the component (A) was replaced by a material prepared by treating a component (A) having a cobalt content of 12.0% with an aqueous solution of sodium hydroxide at 25 to 30° C. thereby dissolving and removing the metallic zinc and leaving metallic cobalt only, Reference Example 3 wherein the component (A) was replaced by cobalt metal powder alone, and Reference Example 4 wherein the component (A) was replaced by a mixture of cobalt metal powder and zinc metal powder (the cobalt metal powder content of the mixture being 12 wt. percent).

TABLE 2

| | Condition for prepg. Component (A) | | Co content of Comp. (A) (Percent) | Yield | 26° C. $[\eta]$ toluene | Polymer | | |
|---|---|---|---|---|---|---|---|---|
| | Zn (g.) | $CoCl_2 \cdot 6H_2O$ (g.) | | | | Microstructure | | |
| | | | | | | Cis-1,4 (Percent) | Trans-1,4 (Percent) | 1,2 (Percent) |
| Example: | | | | | | | | |
| 9 | 3.0 | 0.1 | 3.5 | 60.2 | 3.48 | 98.0 | 1.2 | 0.8 |
| 10 | 3.0 | 0.5 | 5.4 | 68.5 | 3.50 | 97.7 | 1.4 | 0.9 |
| 11 | 3.0 | 2.0 | 12.0 | 80.7 | 3.27 | 97.8 | 1.2 | 1.0 |
| 12 | 3.0 | 5.0 | 30.8 | 70.0 | 4.25 | 97.9 | 1.1 | 1.0 |
| 13 | 3.0 | 7.0 | 49.8 | 47.0 | 3.95 | 97.7 | 1.3 | 1.0 |
| Reference Examples: | | | | | | | | |
| 1 | 3.0 | 0 | 0 | 0 | | | | |
| 2 | 3.0 | 2.0 | 100 | 0 | | | | |
| 3 | | | ¹100 | 0 | | | | |
| 4 | | | ²120 | 0 | | | | |

¹ Contg. 0.2 g. metallic cobalt powder.
² Contg. 0.19 g. metallic cobalt powder and 1.4 g. metallic zinc powder.

Examples 14–21

Under the same polymerization conditions as employed in Example 1 except that the amount of component (A) (prepared in the same manner and which had the same cobalt content as the component (A) as used in Example 1) and component (B) (diethyl aluminum monochloride) were varied, 1,3-butadiene was polymerized. The results are given in Table 3. There was no gelation in any of the cases.

TABLE 3

| Ex. | Amt. of catalyst (g.) | | Polymer | | | | |
|---|---|---|---|---|---|---|---|
| | Comp. (A) | Comp. (B) | Yield (Percent) | 26° C. $[\eta]$ toluene | Microstructure (Percent) | | |
| | | | | | Cis-1,4 | Trans-1,4 | 1,2 |
| 14 | 0.1 | 1.2 | 11.3 | 3.45 | 98.0 | 1.2 | 0.8 |
| 15 | 0.2 | 1.2 | 31.5 | 3.08 | 97.4 | 1.5 | 1.1 |
| 16 | 0.4 | 0.5 | 2.7 | ---- | ---- | ---- | ---- |
| 17 | 0.4 | 1.2 | 52.7 | 3.76 | 97.5 | 1.3 | 1.2 |
| 18 | 0.6 | 0.7 | 21.2 | 2.87 | 97.6 | 1.3 | 1.1 |
| 19 | 0.7 | 0.7 | 34.9 | 2.70 | 97.3 | 1.5 | 1.2 |
| 20 | 0.9 | 1.0 | 54.1 | 3.40 | 97.8 | 1.2 | 1.0 |
| 21 | 0.7 | 1.8 | 81.2 | 3.25 | 97.8 | 1.2 | 1.0 |

Examples 22 to 24

Polymerization was effected under the same conditions as in Example 1 except that the 1.2 g. of diethyl aluminum monochloride was replaced by 0.84 g. of diethyl aluminum monochloride and 0.12 g., 0.24 g., or 0.36 g. of monoethyl aluminum dichloride. The results are shown in Table 4.

TABLE 4

| Example | Amt. of Comp. (B) | | Polymer | | | | |
|---|---|---|---|---|---|---|---|
| | Al(C₂H₅)₂Cl (g.) | Al(C₂H₅)Cl₂ (g.) | Yield (percent) | $[\eta]26°$ C. toluene | Microstructure (percent) | | |
| | | | | | Cis-1,4 | Trans-1,4 | 1,2 |
| 22 | 0.84 | 0.12 | 62.6 | 3.20 | 97.6 | 1.2 | 1.2 |
| 23 | 0.84 | 0.24 | 84.2 | 3.57 | 98.2 | 0.9 | 0.9 |
| 24 [1] | 0.84 | 0.36 | 63.8 | 3.48 | 97.8 | 1.2 | 1.0 |

[1] Unlike other examples, Example 24 was given a polymerization time of 20 minutes.

Example 25

1,3-butadiene was polymerized under the same conditions as in Example 1 except that metallic zinc was replaced by metallic cadmium in preparing the component (A) having a cobalt content of 11 wt. percent and that the polymerization time was extended to 4 hours. Five grams of polybutadiene which contained 96% of cis-1,4 structure and had $$[\eta]_{toluene}^{20°C.} = 3.0$$

was obtained.

Example 26

Isoprene was polymerized with the same amount of the same catalyst as used in Example 1. With a total benzene amount of 100 ml., polymerization temperature of 20° C., and polymerization time of 6 hours, 17.2 g. of isoprene gave 5.3 g. (yield 31%) of polyisoprene having 97.8% of 1,4 structure and 2.2% of 1,2 structure.

What we claim is:

1. A process of polymerizing conjugated dienes for the production of conjugated diene polymers having high cis-1,4-addition contents which comprises contacting conjugated dienes under polymerization conditions with a catalyst prepared from (A) a material formed by electrochemically depositing at least one metal selected from the group consisting of metallic cobalt and metallic nickel on the powder of at least one metal selected from the group consisting of metallic zinc and metallic cadmium and (B) an organic aluminum compound.

2. The process according to claim 1 wherein the material (A) contains a total of 3 to 50 wt. percent of at least one metal selected from the group consisting of metallic cobalt and metallic nickel.

3. The process according to claim 1 wherein the material (A) is formed by mixing an aqueous solution of the water-soluble salt of at least one metal selected from the group consisting of cobalt and nickel with the powder of at least one metal selected from the group consisting of metallic zinc and metallic cadmium, thereby electrochemically depositing at east one metal selected from the group consisting of cobalt and nickel on the powder of at least one metal selected from the group consisting of metallic zinc and metallic cadmium, at a temperature within the range of 0 to 50° C.

4. The process according to claim 1 wherein the powder of at least one metal selected from the group consisting of zinc and cadmium is a powder of particle size less than those passable through a 48-mesh Tyler's standard screen.

5. The process according to claim 1 wherein the organic aluminum compound is a compound of the general formula:

$$AlR_nX_{3-n}$$

wherein R is a group selected from the group consisting of alkyl radical, cycloalkyl radical and phenyl radical, X is a halogen atom, and $n$ is a number between 1 and 3 including decimals.

6. The process according to claim 1 wherein the conjugated dienes are polymerized in an inert solvent selected from the group consisting of aromatic, saturated aliphatic and alicyclic hydrocarbons and derivatives thereof, at a temperature within a range of −20° C. to +80° C.

7. The process according to claim 1 wherein the said catalyst is prepared by using more than 0.1 weight parts of the organic aluminum compound and 1 weight part of the material (A).

No references cited.

JOSEPH L. SCHOFER, *Primary Examiner.*

R. A. GAITHER, *Assistant Examiner.*

U.S. Cl. X.R.

252—431